United States Patent [19]

Ando et al.

[11] Patent Number: 5,912,086
[45] Date of Patent: Jun. 15, 1999

[54] IMPREGNATION COMPOSITION, AND PRIMER COMPOSITION FOR RESIN CONCRETE, METHOD FOR ITS COATING AND COMPOSITE BODY EMPLOYING IT

[75] Inventors: Toshihiro Ando; Shunji Ito, both of Machida, Japan

[73] Assignee: Denki Kagaku Kogyo Kabushiki Kaisha, Tokyo, Japan

[21] Appl. No.: 08/805,249

[22] Filed: Feb. 24, 1997

[30] Foreign Application Priority Data

Mar. 6, 1996 [JP] Japan ................................. 8-048719

[51] Int. Cl.⁶ .......................... B32B 27/00; B32B 27/08
[52] U.S. Cl. ...................... 428/500; 428/515; 428/516; 428/518; 428/519
[58] Field of Search ....................... 428/500, 515, 428/516, 518, 519

[56] References Cited

U.S. PATENT DOCUMENTS 3,575,785  4/1971  McManimie et al. ................... 161/162
4,331,795  5/1982  Ukita et al. ............................. 526/273
5,447,984  9/1995  Ohama et al. .......................... 524/507
5,539,070  7/1996  Zharov et al. ......................... 526/198
5,618,857  4/1997  Newberth, III et al. ............... 523/176

OTHER PUBLICATIONS

Chemical Abstracts, AN 93–348254, JP 5–254960, Oct. 5, 1993.

Chemical Abstracts, AN 92–320005, JP 4–224184, Aug. 13, 1992.

*Primary Examiner*—Richard L. Raymond
*Assistant Examiner*—Deepak R. Rao
*Attorney, Agent, or Firm*—Oblon, Spivak, McClelland, Maier & Neustadt, P.C.

[57] ABSTRACT

An impregnation composition comprising (a) a polyfunctional (meth)acrylate having at least two ethylenically unsaturated double bonds in one molecule, (b) a monofunctional (meth)acrylate, (c) a polymerization initiator, and (d) a decomposition accelerator.

18 Claims, No Drawings

IMPREGNATION COMPOSITION, AND PRIMER COMPOSITION FOR RESIN CONCRETE, METHOD FOR ITS COATING AND COMPOSITE BODY EMPLOYING IT

BACKGROUND OF THE INVENTION

1. Field of the Invention

The present invention relates to an impregnation composition which, when coated on the surface of cement concrete, serves to densify the concrete body surface and to prevent penetration of water or carbon dioxide into the interior. Further, it relates to a primer composition for resin concrete which, when resin concrete is coated on a cement concrete substrate surface, serves to improve the bond strength between the cement concrete substrate surface and the resin concrete. Particularly, it relates to a primer composition for resin concrete which serves to improve the bond strength with a cement concrete substrate in a wet condition.

In this invention, cement concrete means inorganic concrete or mortar.

2. Discussion of Background

Cement concrete is excellent in durability and is widely used in the field of civil engineering and construction, for example, for flooring of buildings or pavement of roads. However, cement concrete is susceptible to erosion by rain, wind, sewage, carbon dioxide and chemicals, and it is desirable to protect such cement concrete by impregnating or coating the cement concrete substrate surface with a resin composition. As a method for protecting cement concrete, a method of using an impregnation composition or a method of using resin concrete may be mentioned.

The method of using an impregnation composition is a method wherein an impregnation composition is impregnated to void spaces in cement concrete to impart resistance against erosion by water or carbon dioxide. The impregnation composition may, for example, be of an epoxy resin type or an acrylic resin type.

The method of using resin concrete may, for example, be a method wherein a cement concrete substrate surface is covered or coated with resin concrete to impart chemical resistance or wear resistance.

Use of resin concrete has been rapidly expanding in recent years by virtue of its characteristics such as excellent chemical resistance and high strength. Commonly used among such resin concretes are resin concretes of e.g. epoxy resin type, urethane resin type, unsaturated polyester resin type and acrylic resin type. These various resin concretes have various characteristics depending upon the natures of their main component resins.

Among these resin concretes, attention has been drawn to unsaturated polyester resin type and acrylic resin type radical polymerizable resin concretes, since their low temperature applicability is good.

However, conventional impregnation compositions have had problems such that they are hardly reactive at a normal temperature or have a high viscosity, so that they have to be subjected to heat polymerization, which makes the operation cumbersome.

As an impregnation composition useful at a normal temperature, an impregnation composition containing a monofunctional (meth)acrylate having a dicyclopentadiene structure in its molecule, has been proposed (JP-A-5-254960). However, this impregnation composition has had a problem that it is required to be impregnated under pressure, which makes the operation cumbersome.

On the other hand, the above mentioned conventional resin concretes also have a draw back that their bond strength is inadequate against a wet surface substrate such as cement concrete wet with water. Accordingly, there has been a problem that the cement concrete substrate surface has to be sufficiently dried prior to application of the resin concrete, which makes the operation cumbersome.

Further, a primer containing a monofunctional (meth) acrylate having a dicyclopentadiene structure in its molecule, has been proposed as a primer which, when coated on a cement concrete substrate surface, serves to improve the bond strength between the substrate surface and resin concrete (JP-A-4-224184). However, this primer has had problems that the bond strength is still inadequate between a wet substrate surface and resin concrete, and the cured product of the primer is brittle and poor in durability.

SUMMARY OF THE INVENTION

To solve the above problems, the present inventors have conducted extensive studies for an impregnation composition which can be impregnated under atmospheric pressure and a primer composition for resin concrete which shows adequate bond strength even to a cement concrete substrate surface in a wet condition. As a result, they have found that when an impregnation composition having a polymerizable compound having a specific structure incorporated, is coated on the substrate surface, adequate impregnation properties and bond strength to such a substrate surface in a wet condition, can be obtained. The present invention has been accomplished on the basis of this discovery.

That is, the present invention provides;

1. An impregnation composition comprising (a) a polyfunctional (meth)acrylate having at least two ethylenically unsaturated double bonds in one molecule, (b) a monofunctional (meth)acrylate, (c) a polymerization initiator, and (d) a decomposition accelerator;

2. A primer composition for resin concrete comprising (a) a polyfunctional (meth)acrylate having at least two ethylenically unsaturated double bonds in one molecule, (b) a monofunctional (meth)acrylate, (c) a polymerization initiator, and (d) a decomposition accelerator;

3. A primer composition for resin concrete comprising (a) a polyfunctional (meth)acrylate having at least two ethylenically unsaturated double bonds in one molecule, (b) a monofunctional (meth)acrylate, (c) a polymerization initiator, (d) a decomposition accelerator, and (e) a polyfunctional (meth)acrylate not having at least two ethylenically unsaturated double bonds in one molecule;

4. The primer composition for resin concrete according to item 2 or 3, wherein the decomposition accelerator comprises a metal salt of an organic acid and/or an organometal chelate compound;

5. A cured body of the primer composition for resin concrete as defined in item 2, 3 or 4;

6. A method for coating a primer composition for resin concrete, which comprises coating the primer composition for resin concrete as defined in item 2, 3 or 4 on cement concrete;

7. A composite body of cement concrete and resin concrete, which comprises cement concrete having the primer composition for resin concrete as defined in item 2, 3 or 4 coated thereon, and resin concrete coated on the coated surface of the cement concrete;

8. The composite body of cement concrete and resin concrete according to item 7, wherein the resin concrete is radical polymerizable resin concrete;

9. A method for producing for a composite body of cement concrete and resin concrete, which comprises coating resin concrete on the surface of cement concrete having the primer composition for resin concrete as defined in item 2, 3 or 4 coated thereon; and 10. The method for producing a composite body of cement concrete and resin concrete according to item 9, wherein the resin concrete is radical polymerizable resin concrete.

DETAILED DESCRIPTION OF THE PREFERRED EMBODIMENTS

Now, the present invention will be described in detail.

In the present invention, (a) the polyfunctional (meth)acrylate having at least two ethylenically unsaturated double bonds in one molecule is one having at least two ethylenically unsaturated double bonds in one molecule and having at least two methacryloyl groups or acryloyl groups in one molecule. Here, an ethylenically unsaturated double bond is meant for an ethylenically unsaturated double bond which is not adjacent to (or which is not conjugated with) a carbonyl group and is not meant for a so-called a, p-unsaturated carbonyl group. This component (a) serves to provide firm bond strength when coated on cement concrete in a wet condition.

For example, (a) the polyfunctional (meth)acrylate having at least two ethylenically unsaturated double bonds in one molecule may be both terminal methacryl-modified liquid polybutadiene "TE-2000" (manufactured by Nippon Soda Co., Ltd.), both terminal methacryl-modified liquid polyacrylonitrilebutadiene "HycarVTBNX" (manufactured by Ube Industries, Ltd.), both terminal methacryl-modified liquid partially hydrogenated polybutadiene "TEAI-1000" (manufactured by Nippon Soda Co., Ltd.) and both terminal methacryl-modified liquid polybutadiene "BAC-45" (manufactured by Osaka Yuki K.K.).

Such component (a) is used preferably in an amount of from 1 to 90 parts by weight, more preferably from 3 to 80 parts by weight, per 100 parts by weight of the sum of components (a) and (b), taking the bonding property and the curing property into consideration. If the amount is less than 1 part by weight, the impregnating ability or the bonding property tends to be low. If it exceeds 90 parts by weight, the impregnating ability or the bonding property to cement concrete tends to be low.

In the present invention, (b) the single functional (meth) acrylate is one having one methacryloyl group or one acryloyl group in one molecule. Such component (b) is able to be impregnated and bonded well to cement concrete and serves to improve the impregnating ability or the bonding property.

For example, the monofunctional (meth)acrylate may preferably be a monofunctional (meth)acrylate having no ethylenically unsaturated double bond in its molecule, such as (meth)acrylic acid, methyl (meth)acrylate, ethyl (meth) acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth) acrylate, phenyl (meth)acrylate, cyclohexyl (meth)acrylate, dicyclopentanyl (meth)acrylate, isobornyl (meth)acrylate, methoxylated cyclodecatriene (meth)acrylate, 2-hydroxyethyl (meth)acrylate, 2-hydroxypropyl (meth) acrylate, 3-hydroxypropyl (meth)acrylate, 4-hydroxybutyl (meth)acrylate, polyethylene glycol mono(meth)acrylate, polypropylene glycol mono(meth)acrylate, alkyloxypolyethylene glycol mono (meth) acrylate, alkyoxypolyproylene glycol mono(meth)acrylate, phenoxypolypropylene glycol mono(meth)acrylate, phenoxypolypropylene glycol mono (meth)acrylate, tetrahydrofurfuryl (meth)acrylate, 2-hydroxy-3-phenoxypropyl (meth)acrylate, glycidyl (meth)acrylate, caprolactone-modified tetrahydrofurfuryl (meth)acrylate, 3-chloro-2-hydroxypropyl (meth)acrylate, N, N-dimethylaminoethyl (meth)acrylate, N, N-diethylaminoethyl (meth)acrylate, t-buthylaminoethyl (meth)acrylate, morpholine (meth)acrylate, ethoxycarbonylmethyl (meth)acrylate, ethyleneoxide-modified phthalic acid (meth)acrylate, ethyleneoxide-modified succinic acid (meth)acrylate, trifluoroethyl (meth)acrylate, tetrafluoropropyl (meth)acrylate or 2-hydroxy-3-(meth) acryloyloxypropyltrimethylammonium chloride.

Among them, a monofunctional (meth)acrylate ester having no ethylenically unsaturated double bond in its molecule, is preferred, since it has good compatibility with component (a). A $C_{1-12}$ alkyl mono(meth)acrylate and/or a $C_{1-12}$ hydroxyalkyl mono(meth)acrylate is more preferred.

Additionally, a monofunctional (meth)acrylate having one ethylenically unsaturated double bond in one molecule, such as dicyclopentenyl acrylate, dicyclopentenyl methacrylate, dicyclopentenyloxyethyl acrylate or dicyclopentenyloxyethyl methacrylate, may be used to such an extent not to impair the purpose of the present invention.

Such component (b) is used preferably in an amount of from 10 to 99 parts by weight, more preferably from 20 to 97 parts by weight, per 100 parts by weight of the sum of components (a) and (b), taking the bonding property and the curing property into consideration. If the amount is less than 10 parts by weight, the impregnating ability or the bonding property to cement concrete tends to be low, and if it exceeds 99 parts by weight, the impregnating ability or the bonding property tends to be low.

In the present invention, (c) the polymerization initiator has a function of a so-called radical polymerization initiator. For example, the following organic peroxides may be mentioned.

(1) Ketone peroxides: such as methyl ethyl ketone peroxide, cyclohexanone peroxide, 3,3,5-trimethylcyclohexanone peroxide, methylcyclohexanone peroxide, methylacetoacetate peroxide and acetylacetone peroxide.

(2) Peroxyketals: such as 1,1-bis(tert-butylperoxy)-3,3,5-trimethylcyclohexane, 1,1-bis(tert-butylperoxy) cyclohexane, 2,2-bis(tert-butylperoxy)octane, n-butyl-4,4-bis(tert-butylperoxy)valerate and 2,2-bis(tert-butylperoxy) butane.

(3) Hydroperoxides: such as tert-butyl hydroperoxide, cumene hydroperoxide, diisopropylbenzene hydroperoxide, paramethane hydroperoxide, 2,5-dimethylhexane-2,5-dihydroperoxide and 1,1,3,3-tetramethylbuthyl hydroperoxide.

(4) Dialkyl peroxides: such as di-tert-butyl peroxide, tert-butylcumyl peroxide, dicumyl peroxide, α, α'-bis(tert-butylperoxy-meta-isopropyl)benzene, 2,5-dimethyl-2,5-di (tert-butylperoxy)hexane and 2,5-dimethyl-2,5-di(tert-butylperoxy)hexyne-3.

(5) Diacyl peroxides: such as acetyl peroxide, isobutyl peroxide, octanoyl peroxide, decanoyl peroxide, laurynoyl peroxide, 3,3,5-trimethylhexanoyl peroxide, succinic acid peroxide, benzoyl peroxide, 2,4-dichlorobenzoyl peroxide and m-toluoyl peroxide.

(6) Peroxydicarbonates: such as diisopropyl peroxydicarbonate, di-2-ethylhexyl peroxydicarbonate, di-n-propyl peroxydicarbonate, bis(4-tert-butylcyclohexyl) peroxydicarbonate, di-2-ethoxyethyl peroxydicarbonate, dimethoxyisopropyl peroxydicarbonate, di(3-methyl-3-methoxybutyl) peroxydicarbonate and diallyl peroxydicarbonate.

(7) Peroxy esters: such as tert-butyl peroxy acetate, tert-butyl peroxy isobutylate, tert-butyl peroxy pivalate, tert-butyl peroxy neodecanoate, cumyl peroxy neodecanoate, tert-butyl peroxy-2-ethylhexanoate, tert-butyl peroxy-3,3,5-trimethyl hexanoate, tert-butyl peroxy laurate, tert-butyl peroxy benzoate, di-tert-butyl peroxy isophthalate, 2,5-dimethyl-2,5-di(benzoyl peroxy)hexane, tert-butyl peroxymaleic acid, tert-butyl peroxy isopropyl carbonate, cumyl peroxy octoate, tert-hexyl peroxy neodecanoate, tert-hexyl peroxy pivalate, tert-butyl peroxy neohexanoate, tert-hexyl peroxy neohexanoate and cumyl peroxy neohexanoate.

(8) Other organic peroxides: such as acetylcyclohexylsulfonyl peroxide and tert-butyl peroxyallyl carbonate.

Further, the following azo compounds may, for example, be mentioned as polymerization initiators other than organic peroxides:

(9) Azonitrile compounds: such as azobisisobutylonitrile, 2,2'-azobis(4-methoxy-2,4-dimethylvaleronitrile), 1,1'-azobis(cyclohexane-1-carbonitrile), 1-[(1-cyano-1-methylethyl)azo]formamide and 2-phenylazo-4-methoxy-2,4-dimethylvaleronitrile.

(10) Azoamidine compounds: such as 2,2'-azobis(2-methylpropionamidine) dihydrochloride.

(11) Cyclic azoamidine compounds: such as 2,2'-azobis[2-(2-imidazolin-2-yl)propane].

(12) Azoamide compounds: such as 2,2'-azobis{2-methyl-n-[1,1-bis(hydroxymethyl)-2-hydroxyethyl]propyonamide} and 2,2'-azobis{2-methyl-n-[1,1-bis(hydroxymethyl)ethyl]propionamide}.

(13) Alkylazo compounds: such as 2,2'-azobis(2,4,4-trimethylpentane).

These initiators may be used alone or in combination as a mixture of two or more of them. Among the polymerization initiators, an organic peroxide is preferred from the view point of the curing property.

Component (c) is used preferably in an amount of from 0.2 to 10 parts by weight per 100 parts by weight of the sum of components (a) and (b) and after-mentioned component (e) which may be used as the case requires. If the amount is less than 0.2 part by weight, curing tends to be slow, and if it exceeds 10 parts by weight, no further improvement in the curing speed, etc. will be obtained, and deterioration in the impregnating ability or the bonding property is likely to result.

In the present invention, (d) the decomposition accelerator is a compound which accelerates decomposition of the polymerization initiator. For example, the following compounds may be mentioned.

(1) Thiourea derivatives: such as diethylthiourea, dibutylthiourea, ethylenethiourea, tetramethylthiourea, mercaptobenzimidazole and benzoylthiourea.

(2) Amines: such as N,N-diethyl-p-toluidine, N,N-dimethyl-p-toluidine, N,N-diisopropanol-p-toluidine, triethylamine, tripropylamine, ethyldiethanolamine, N,N-dimethylaniline, ethylenediamine, triethanolamine and an aldehyde-amine condensate.

(3) Metal salts of organic acids: such as cobalt naphthenate, copper naphthenate, zinc naphthenate, cobalt octylate, copper octylate and zinc octylate.

(4) Organometal chelates: such as copper acetylacetonate, titanium acetylacetonate, manganese acetylacetonate, chromium acetylacetonate, iron acetylacetonate, vanadyl acetylacetonate and cobalt acetylacetonate.

These decomposition accelerators may be used alone or in combination as a mixture of two or more of them.

Among them, thiourea derivatives, metal salts of organic acids and organometal chelate compounds are preferred from the viewpoint of the impregnating ability, the bonding properties and the curing properties, particularly with a view to improvement of the bonding property with a wet cement concrete substrate surface. A metal salt of an organic acid and/or an organometal chelate compound is particularly preferred.

Component (d) is used preferably in an amount of from 0.1 to 10 parts by weight per 100 parts by weight of the sum of components (a) and (b) and after-mentioned component (e) which may be used as the case requires. If the amount is less than 0.1 part by weight, curing tends to be slow, and if it exceeds 10 parts by weight, no further improvement in the curing speed, etc. is obtainable, and deterioration in the impregnating ability or the bonding property is likely to result.

In the present invention, it is preferred to further use (e) a polyfunctional (meth)acrylate not having at least two ethylenically unsaturated double bonds in one molecule. Control of the curing speed or the resin properties can be facilitated by incorporating (e) the polyfunctional (meth)acrylate not having at least two ethylenically unsaturated double bonds in one molecule.

For example, the polyfunctional (meth)acrylate not having at least two ethylenically unsaturated double bonds in one molecule, may be polyethylene glycol di(meth)acrylate, polyglycerol di(meth)acrylate, polypropylene glycol di(meth)acrylate, polybutylene glycol di(meth)acrylate, 1,4-butanediol di(meth)acrylate, 1,6-hexanediol di(meth)acrylate, neopentyl glycol di(meth)acrylate, trimethylolpropane tri(meth)acrylate, pentaerythritol tetra(meth)acrylate, dipentaerythritol hexa(meth)acrylate, tris(meth)acryloyloxyethyl isocyanurate, 2,2-bis(4-(meth)acryloxyphenyl)propane, 2,2-bis(4-(meth)acryloxyethoxyphenyl)propane, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane, epoxy acrylate "Biscote #540" (manufactured by Osaka Yuki Kagaku Kogyo K.K.), epoxy acrylate "Epoxyester 3000M" (manufactured by Kyoeisha Kagaku K.K.) and urethane acrylate "Aronix M-1100" (manufactured by Toagosei Chemical Industries Co., Ltd.). These compounds may be used alone or in combination as a mixture of two or more of them.

Such component (e) is used preferably in an amount of at most 50 parts by weight, more preferably from 1 to 30 parts by weight, per 100 parts by weight of the sum of components (a), (b) and (e) in view of the impregnating ability, the bonding property and the curing property. If the amount exceeds 50 parts by weight, the impregnating ability or the bonding property to a wet substrate surface is likely to be low.

Further, in the present invention, it is preferred to use (f) a coupling agent. The coupling agent (f) will react with moisture contained in the cement concrete substrate surface, whereby it is effective for improving the impregnating ability or the bonding property between the cement concrete substrate surface and the impregnation composition or the primer composition for resin concrete. As such a coupling agent, a silane coupling agent or a titanate coupling agent may, for example, be mentioned.

The silane coupling agent may, for example, be γ-chloropropyltrimethoxysilane, vinyltrimethoxysilane, vinyltrichlorosilane, vinyltriethoxysilane, vinyl-tris(β- methoxyethoxy) silane, γ-methacryloxypropyltrimethoxysilane, γ-acryloxypropyltrimethoxysilane, β-(3,4-epoxycyclohexyl) ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane or γ-ureidepropyltriethoxysilane.

The titanate coupling agent may, for example, be isopropyltriisostearoyl titanate, isopropyltridodecylbenzenesulphonyl titanate, isopropyltris(dioctylbirophosphate) titanate, tetraisopropylbis(dioctylphosphite) titanate, tetraoctylbis(ditridecylphosphite) titanate, tetra(2,2-diallyloxy-1-butyl)bis(ditridecylphosphite) titanate, bis (dioctylbirophosphate) oxyacetate titanate, bis (dioctylbirophosphate) ethylene titanate, isopropyltrioctanoyl titanate, isopropyldimethacrylisostearoyl titanate, isopropylisostearoyldiacryl titanate, isopropylisotri(dioctylphosphate) titanate, isopropyltricumilphenyl titanate, isopropyltri(N-aminoethyl-aminoethyl) titanate, dicumylphenyloxyacetate titanate or diisostearoylethylene titanate.

Among these coupling agents, a silane coupling agent is preferred, since it provides excellent effects. More preferred is a mercaptosilane type coupling agent such as γ-mercaptopropyltrimethoxysilane, a vinylsilane type coupling agent such as vinyltriethoxysilane or vinyl-tris(β-methoxyethoxy) silane, or a (meth)allylsilane type silane coupling agent such as γ-mercaptopropyltrimethoxysilane, since it is copolymerizable with components (a), (b) and (e).

Such component (f) is used preferably in an amount of from 0.001 to 5 parts by weight per 100 parts by weight of the sum of components (a) and (b) and component (e) which may be used as the case requires, in view of the impregnating ability, the bonding property and the curing property. If the amount is less than 0.001 part by weight, no adequate effects will be obtained, and if it exceeds 5 parts by weight, the bonding property or the impregnating ability is likely to be low.

In the present invention, an inorganic filler or an organic filler may be used for adjusting the thixotropic properties.

The inorganic filler may, for example, be silica powder such as crystalline silica powder, molten silica powder, spherical silica powder or fumed silica, silica sand, carbon black, phorestenite, clay, titanium oxide, magnesium oxide, iron oxide, bentonite, mica, lead chromate, nickel slug, aluminum hyroxide, alumina powder including spherical powder, stainless steel powder, silicon carbide powder, silicon nitride powder, boron nitride powder, talc powder, calcium carbonate powder, glass beads, silas balloons, aluminum power or titanium powder.

The organic filler may, for example, be polyethylene powder, coal tar, urethane resin powder, (meth)acrylic resin powder, silicone resin powder, fluorine resin powder, phenol resin powder, wood powder or reclaimed powder.

Such an inorganic filler or an organic filler is used preferably in an amount of from 3 to 150 parts by weight per 100 parts by weight of the sum of components (a) and (b) and component (e) which may be used as the case requires, in view of the impregnating ability, the bonding property and the curing property. If the amount is less than 3 parts by weight, no adequate effects tend to be obtained, and if it exceeds 150 parts by weight, the impregnating ability or the bonding property is likely to deteriorate.

To the impregnation composition or the primer composition for resin concrete of the present invention, a small amount of a polymerization inhibitor may be incorporated to improve the storage stability.

For example, the polymerization inhibitor may be methylhydroquinone, hydroquinone, catechol, hydroquinone monomethyl ether, mono-tert-butylhydroquinone, 2,5-di-tert-butylhydroquinone, p-benzoquinone, 2,5-diphenyl-p-benzoquinone, 2,5-di-tert-butyl-p-benzoquinone, picric acid, phenothiazine, tert-butylcatechol, 2-butyl-4-hydroxyanisole, or 2,6-di-tert-butyl-p-cresol.

Such a polymerization inhibitor is used preferably in an amount of from 0.001 to 3 parts by weight, more preferably from 0.01 to 2 parts by weight, per 100 parts by weight of the sum of components (a) and (b) and component (e) which may be used as the case requires. If the amount is less than 0.001 part by weight, the storage stability tends to be low, and if it exceeds 3 parts by weight, the impregnating ability or the bonding property tends to be low, and the curing time is likely to be long.

To the impregnation composition or the primer composition for resin concrete of the present invention, additives which are commonly used, such as various elastomers, a solvent, an extender, a reinforcing material, a plasticizer, a thickner, a thixotropic agent, a chelating agent, a dyestuff, a pigment, a flame retardant and a surfactant, may be incorporated within a range not impair the purpose of the present invention.

According to the present invention, cement concrete having erosion resistance can be obtained by impregnating the impregnation composition to cement concrete.

The primer composition for resin concrete is coated on cement concrete, and then resin concrete is further coated thereon to obtain a composite body of cement concrete and resin concrete, to protect the surface of the cement concrete. By using the primer for resin concrete, the resin concrete will be capable of showing an adequate bonding property to the wet substrate surface of cement concrete.

The resin concrete has characteristics such as excellent chemical resistance and high strength and can be obtained by mixing an aggregate such as sand, gravel or the above-mentioned inorganic filler to a resin composition such as an epoxy resin, a urethane resin, an unsaturated polyester resin or an acrylic resin by a concrete mixer or a hand mixer.

The blend ratio of the resin composition to the aggregate is preferably resin composition: aggregate=5 to 95 parts by weight: 95 to 5 parts by weight, more preferably resin composition: aggregate=8 to 30 parts by weight: 92 to 70 parts by weight, in 100 parts by weight of the sum of the resin composition and the aggregate. If the resin composition is less than 5 parts by weight, or if the aggregate exceeds 95 parts by weight, the bond strength tends to be low, and if the resin composition exceeds 95 parts by weight, or if the aggregate is less than 5 parts by weight, the viscosity tends to be high, and the operation efficiency tends to be poor, or a large amount of the resin composition will be required, which adds to the cost.

Among these resin concretes, a radical polymerizable unsaturated polyester resin type or acrylic resin type resin concrete is preferred, and more preferred is an acrylic resin type resin concrete, since the low temperature applicability is good, and it is radical polymerizable like the primer composition for resin concrete of the present invention.

A method for impregnating the impregnation composition of the present invention may be such that the impregnation composition prepared by mixing components (a), (b), (c) and (d) and components (e) and (f) which may be used as the case requires, all at once, is impregnated onto a cement concrete substrate surface. The impregnation composition of the present invention can be impregnated at a normal temperature under atmospheric pressure, whereby the operation is easy. The amount of the impregnation composition to be used is not particularly limited, but it is usually preferably from 10 to 30 parts by weight, more preferably from 15 to 20 parts by weight, to the cement concrete prior to impregnation.

A method of coating the primer composition for resin concrete of the present invention may, for example, be such that the impregnation composition or the primer composition for resin concrete prepared by mixing components (a), (b), (c) and (d) and components (e) and (f) which may be incorporated as the case requires, all at once, is coated in a thickness of from 0.1 to 0.5 mm on a cement concrete substrate surface, and then resin concrete is coated on the surface to obtain a composite body of cement concrete and resin concrete. It is preferred to coat resin concrete on the surface of a cured body of the coated primer composition for resin concrete.

Coating of the impregnation composition or the primer composition for resin concrete of the present invention, or resin concrete, can be carried out by a usual method for coating a coating material, such as spray coating or brush coating.

Otherwise, components (a) and (b) and components (e) and (f) which may be used as the case requires, may be divided into two liquids, and (c) the polymerization initiator may be added to one liquid, and (d) the decomposition accelerator may be added to the other liquid, so that both liquids may be mixed at the application site.

Now, the present invention will be described in further detail with reference to Examples. However, it should be understood that the present invention is by no means restricted to such specific Examples.

A concrete pavement plate as stipulated in JIS A5304 was used as a cement concrete substrate.

The surface of the above concrete pavement substrate was polished by a sand paper AA No.80 (manufactured by Bellstar Co.) and then left to stand for one week in an atmosphere of 20° C. under a relative humidity of 65%, whereupon it was used as a cement concrete substrate surface in a dry state.

The surface of the above concrete pavement plate was polished by a sand paper AA No.80, then the plate was immersed in water of the 20° C. for one day in a constant temperature tank, then a part of water in the constant temperature tank was withdrawn, and the pavement plate was used in such a state that the portion corresponding to 5 mm from the surface, was exposed in an atmosphere of 20° C. under a relative humidity of 80%, as a cement concrete substrate surface in a wet condition.

Further, the following material was used as resin concrete.

1.5 parts by weight of benzoyl peroxide was added to 100 parts by weight of a uniform mixture comprising 30 parts by weight of polymethyl methacrylate resin, 64.5 parts by weight of methyl methacrylate, 5 parts by weight of trimethylolpropane trimethacrylate and 0.5 part by weight of N,N-dimethyl-p-toluidine, to obtain a resin solution for resin concrete. On the other hand, a mixture comprising 80 parts by weight of sand and 20 parts by weight of fumed silica, was used as aggregate. Then, 20 parts by weight of the resin solution for resin concrete thus obtained was mixed with 80 parts by weight of the aggregate to obtain resin concrete.
Materials Used Sand: river sand from Ooi River, particle size: at most 5 mm Fumed silica; commercially available fumed silica, specific surface area: 14 $m^2/g$

EXAMPLES 1 TO 21 AND COMPARATIVE EXAMPLES 1 TO 5

Primer compositions for resin concrete having the compositions as identified in Tables 1 to 6, were prepared by using commercial products.

However, in Comparative Example 3, no primer composition for resin concrete was used; in Comparative Example 4, "Bond E810" (aliphatic type epoxy, polyamine curing agent type) manufactured by Konishi K.K. was used as a primer composition for resin concrete; and in Comparative Example 5, "FP-NS" (aliphatic type epoxy, polyamine curing agent type) manufactured by Tonen K.K., was used as a primer composition for resin concrete.

Then, each primer composition for resin concrete mixed to have the composition as identified in Tables 1 to 6, was coated in a thickness of about 0.3 mm on the cement concrete substrate surface in a dry state, by brush coating and left to stand for 5 hours in an atmosphere of 20° C. under a relative humidity of 65% for curing. Then, on each cured body of the primer composition for resin concrete, a concrete form having a size of 40 mm×40 mm and a thickness of 30 mm was placed, and resin concrete was cast into the concrete form for coating, followed by aging for curing in an atmosphere of 20° C. under a relative humidity of 65% for three days.

On the other hand, to a cement concrete substrate surface in a wet condition, a test was carried out in the same manner as for the cement concrete substrate surface in a dry state, except that the primer composition for resin concrete was coated and cured in an atmosphere of 20° C. under a relative humidity of 80%, and then acrylic resin type resin concrete was aged and cured in the same atmosphere.

Then, a jig made of steel having a size of 40 mm×40 mm and a thickness of 25 mm was bonded by an epoxy resin to the surface of resin concrete, and the steel jig was pulled by means of a Tateken type bond strength tester to measure the bond strength between the cement concrete substrate surface and the resin concrete, and the breaking state was inspected. The results are shown in Tables 1 to 6.
Materials Used Bisphenol A diglycidylether-dimethacrylate: epoxy 3000M (manufactured by Kyoeisha Kagaku K.K.)

Both terminal methacryl-modified liquid polybutadiene: TE-2000 (manufactured by Nippon Soda Co., Ltd.)

Both terminal acryl-modified liquid polyacrylonitrilebutadiene: HycarVTBNX (manufactured by Ube Industries, Ltd.)

Both terminal methacryl-modified liquid partially hydrogenated polybutadiene: TEAI-1000 (manufactured by Nippon Soda Co., Ltd.)

Both terminal acryl-modified polybutadiene: BAC-45 (manufactured by Osaka Yuki K.K.)

TABLE 1

Mixing of a primer composition for resin concrete (unit: parts by weight)

| Components | Example 1 | Example 2 | Example 3 | Example 4 | Example 5 |
|---|---|---|---|---|---|
| Component (a) | | | | | |
| Both terminal methacryl-modified liquid polybutadiene | 70 | 80 | 90 | 1 | 3 |
| Component (b) | | | | | |
| Methyl methacrylate | 10 | 10 | 5 | 45 | 43 |
| 2-Hydroxyethyl methacrylate | 20 | 10 | 5 | 54 | 54 |
| Component (c) | | | | | |
| Cumene hydroperoxide | 2 | 2 | 2 | 2 | 2 |
| Component (d) | | | | | |
| Cobalt octylate | 1 | 1 | 1 | 1 | 1 |
| N,N-dimethyl-p-toluidine | 1 | 1 | 1 | 1 | 1 |
| Bond strength (dry substrate) | 42 | 40 | 37 | 32 | 43 |
| Breaking state (dry substrate) | Material | Material | Material | Material | Material |
| Bond strength (wet substrate) | 35 | 33 | 33 | 31 | 44 |
| Breaking state (wet substrate) | Material | Material | Material | Material | Material |

Notes: Unit of bond strength: Kgf/cm²
In the Table, "Material" means material breakage.

TABLE 2

Mixing of a primer composition for resin concrete (unit: parts by weight)

| Components | Example 6 | Example 7 | Example 8 | Example 9 | Example 10 |
|---|---|---|---|---|---|
| Component (a) | | | | | |
| Both terminal methacryl-modified liquid polybutadiene | 5 | 50 | 50 | 50 | 53 |
| Component (b) | | | | | |
| Methyl methacrylate | 40 | 20 | 20 | 20 | 21 |
| 2-Hydroxyethyl methacrylate | 50 | 25 | 25 | 25 | 26 |
| Component (c) | | | | | |
| Cumene hydroperoxide | 2 | 2 | 2 | 2 | 2 |
| Component (d) | | | | | |
| Ethylene thiourea | | | 2 | | |
| Cobalt octylate | 1 | 1 | 2 | | 1 |
| N,N-dimethyl-p-toluidine | 1 | 1 | | | 1 |
| Component (e) | | | | | |
| Trimethylolpropane trimethacrylate | | 5 | 5 | 5 | |
| Bond strength (dry substrate) | 34 | 45 | 45 | 37 | 40 |
| Breaking state (dry substrate) | Material | Material | Material | Material | Material |
| Bond strength (wet substrate) | 33 | 42 | 43 | 30 | 40 |
| Breaking state (wet substrate) | Material | Material | Material | Material | Material |

Notes: Unit of bond strength: Kgf/cm²
In the Table, "Material" means material breakage.

TABLE 3

Mixing of a primer composition for resin concrete (unit: parts by weight)

| Components | Example 11 | Example 12 | Example 13 | Example 14 | Example 15 |
|---|---|---|---|---|---|
| Component (a) | | | | | |
| Both terminal methacryl-modified liquid polybutadiene | 45 | 37 | 26 | 11 | 50 |
| Component (b) | | | | | |
| Methyl methacrylate | 18 | 15 | 11 | 4 | 20 |
| 2-Hydroxyethyl methacrylate | 22 | 18 | 13 | 5 | |
| Dicyclopentenyloxyethyl methacrylate | | | | | 25 |
| Component (c) | | | | | |
| Cumene hydroperoxide | 2 | 2 | 2 | 2 | 2 |
| Component (d) | | | | | |
| Ethylene thiourea | | | | | 1 |
| Cobalt octylate | 1 | 1 | 1 | 1 | |
| N,N-dimethyl-p-toluidine | 1 | 1 | 1 | 1 | 1 |
| Component (e) | | | | | |
| Trimethylolpropane trimethacrylate | 15 | 30 | 50 | 80 | 5 |
| Bond strength (dry substrate) | 40 | 45 | 40 | 32 | 32 |
| Breaking state (dry substrate) | Material | Material | Material | Material | Material |
| Bond strength (wet substrate) | 38 | 43 | 39 | 30 | 26 |
| Breaking state (wet substrate) | Material | Material | Material | Material | Material |

Notes: Unit of bond strength: Kgf/cm²
In the Table, "Material" means material breakage.

TABLE 4

Mixing of a primer composition for resin concrete (unit: parts by weight)

| Components | Example 16 | Example 17 | Example 18 | Example 19 | Example 20 |
|---|---|---|---|---|---|
| Component (a) | | | | | |
| Both terminal methacryl-modified liquid polybutadiene | 50 | 50 | | | |
| Both terminal acryl-modified liquid acrylonitrilebutadiene | | | 50 | | |
| Both terminal methacryl-modified liquid partially hydrogenated polybutadiene | | | | 50 | |
| Both terminal acryl-modified liquid polybutadiene | | | | | 50 |
| Component (b) | | | | | |
| Methyl methacrylate | 20 | 20 | 20 | 20 | 20 |
| 2-Hydroxyethyl methacrylate | | 25 | 25 | 25 | 25 |
| Dicyclopentenyloxy ethylmethacrylate | 25 | | | | |
| Component (c) | | | | | |
| Cumene hydroperoxide | 2 | 2 | 2 | 2 | 2 |
| Component (d) | | | | | |
| Cobalt octylate | 1 | 1 | 1 | 1 | 1 |
| N,N-dimethyl-p-toluidine | 1 | 1 | 1 | 1 | 1 |
| Component (e) | | | | | |
| Bisphenol A diglycidylether dimethacrylate | | 5 | | | |
| Trimethylolpropane trimethacrylate | 5 | | 5 | 5 | 5 |
| Bond strength (dry substrate) | 38 | 30 | 33 | 40 | 38 |
| Breaking state (dry substrate) | Material | Material | Material | Material | Material |
| Bond strength (wet substrate) | 30 | 30 | 30 | 33 | 35 |
| Breaking state (wet substrate) | Material | Material | Material | Material | Material |

Notes: Unit of bond strength: Kgf/cm$^2$
In the Table, "Material" means material breakage.

TABLE 5

Mixing of a primer composition for resin concrete (unit: parts by weight)

| Components | Example 21 |
|---|---|
| Component (a) | |
| Both methacryl-modified liquid polybutadiene | 50 |
| Component (b) | |
| Methyl methacrylate | 20 |
| 2-Hydroxyethyl methacrylate | 25 |
| Component (c) | |
| Cumene hydroperoxide | 2 |
| Component (d) | |
| Cobalt octylate | 2 |
| Component (e) | |
| Trimethylolpropane trimethacrylate | 5 |
| Component (f) | |
| Vinyltriethoxysilane | 1 |
| Bond strength (dry substrate) | 40 |
| Breaking state (dry substrate) | Material |
| Bond strength (wet substrate) | 35 |
| Breaking state (wet substrate) | Material |

Notes: Unit of bond strength: Kgf/cm$^2$
In the Table, "Material" means material breakage.

TABLE 6

Mixing of a primer composition for resin concrete (unit: parts by weight)

| Components | Comparative Example 1 | Comparative Example 2 | Comparative Example 3 | Comparative Example 4 | Comparative Example 5 |
|---|---|---|---|---|---|
| Component (a) | | | | | |
| Both methacryl-modified liquid polybutadiene | 0 | 0 | | | |
| Component (b) | | | | | |
| Methyl methacrylate | 63 | | | | |
| 2-Hydroxyethyl methacrylate | 25 | | | | |
| Dicyclo-pentenyloxy ethyl-methacrylate | | 70 | | | |
| Component (c) | | | | | |
| Cumene hydroperoxide | 2 | 2 | | | |
| Component (d) | | | | | |
| Ethylene thiourea | 1 | | | | |
| Cobalt octylate | | 1 | | | |
| N,N-dimethyl-p-toluidine | 1 | 1 | | | |
| Component (e) | | | | | |
| Bisphenol A diglycidylether-dimethacrylate | 12 | 30 | | | |
| Bond strength (dry substrate) | 28 | 32 | 21 | 26 | 22 |
| Breaking state (dry substrate) | Surface layer | Material | Surface layer | Surface layer | Surface layer |
| Bond strength (wet substrate) | 26 | 28 | 13 | 10 | 11 |
| Breaking state (wet substrate) | Surface layer | Surface layer | Interface | Interface | Interface |

Notes: Unit of bond strength: Kgf/cm$^2$
In the Table, "Material" means material breakage, "Surface layer" means surface layer breakage, and "Interface" means interface breakage.
Comparative Example 3: No polymer
Comparative Example 4: Bond E810 (aliphatic epoxy, polyamine curing agent type) manufactured by Konishi K.K.
Comparative Example 5: EP-NS (aliphatic epoxy, polyamine curing agent type) manufactured by Tonen K.K.

EXAMPLE 22

The test was carried out in the same manner as in Example 8 except that a commercially available unsaturated polyester resin was used as the resin solution for resin concrete. The results are shown in Table 7.

COMPARATIVE EXAMPLE 6

The test was carried out in the same manner as in Comparative Example 4 except that a commercially available unsaturated polyester resin was used as the resin solution for resin concrete. The results are shown in Table 7.

TABLE 7

Bond strength test results

|  | Example 22 | Comparative Example 6 |
|---|---|---|
| Bond strength (dry substrate) | 43 | 23 |
| Breaking state (dry substrate) | Material | Surface layer |
| Bond strength (wet substrate) | 41 | 11 |
| Breaking state (wet substrate) | Material | Interface |

Note: Unit of bond strength: Kgf/cm$^2$

EXAMPLE 23

The primer composition for resin concrete having the composition of Example 8, was used as an impregnation composition. The impregnation composition was coated on the surface of a mortar test specimen in a dry state prepared in accordance with JIS R 5201 10.4 (1992) in an amount of 300 g/m$^2$ by brush coating, followed by curing.

Then, the mortar test specimen coated with the impregnation composition was immersed in water of 20° C. for a predetermined period of time, whereupon the weight difference before and after the immersion was taken as water absorption. The results are shown in Table 8.

TABLE 8

Water resistance test results

|  | Example 23 | Comparative Example 7 |
|---|---|---|
| Water absorption (7 days) | 3.0 | 10.0 |
| Water absorption (14 days) | 3.5 | 11.0 |
| Water absorption (21 days) | 4.0 | 11.5 |
| Water absorption (28 days) | 4.0 | 12.0 |

Note: Unit of water absorption: g

COMPARATIVE EXAMPLE 7

The test was carried out in the same manner as in Example 23 except that no impregnation composition was used. The results are shown in Table 8.

As described in the foregoing, the impregnation composition of the present invention is excellent in the operation efficiency, since it can be coated at a normal temperature under atmospheric pressure, and by using it, it is possible to obtain cement concrete which is excellent in the durability against water and carbon dioxide.

Further, by using the primer composition for resin concrete, it is possible to obtain an excellent bonding property between a cement concrete substrate surface and resin concrete not only in a dry condition but also in a wet condition. Especially when a civil engineering structure is to be reinforced or mended or when a composite body of cement concrete and resin concrete is to be produced, the primer composition for resin concrete of the present invention provides excellent properties which have not been attained heretofore.

What is claimed is:

1. A method for coating a primer composition for resin concrete, which comprises coating a primer composition for resin concrete on cement concrete, wherein said primer composition comprises
    (a) a both terminal (meth)acryl-modified liquid polybutadiene, a both terminal (meth)acryl modified polyacrylonitrilebutadiene or a both terminal (meth) acryl-modified liquid partially hydrogenated polybutadiene,
    (b) a monofunctional (meth)acrylate,
    (c) a polymerization initiator,
    (d) a decomposition accelerator, and
    (f) a coupling agent.

2. The method according to claim 1, wherein the decomposition accelerator comprises a metal salt of an organic acid and/or an organometal chelate compound.

3. A cured body of the cement concrete obtained by the method as defined in claim 1.

4. The method according to claim 1, wherein the coupling agent is a silane or titanate.

5. The method according to claim 1, wherein (a) is present in an amount of 1 to 90 parts by weight per 100 parts by weight of (a) and (b), (b) is present in an amount of 10 to 99 parts by weight per 100 parts by weight of (a) and (b), (c) is present in an amount of from 0.2 to 10 parts by weight per 100 parts by weight of (a) and (b), (d) is present in an amount of 0. 1 to 10 parts by weight per 100 parts by weight of (a) and (b), and (f) is present in an amount of from 0.001 to 5 parts by weight per 100 parts by weight of (a) and (b).

6. A composite body of cement concrete and resin concrete, which comprises cement concrete having a primer composition for resin concrete coated thereon, and resin concrete coated on the coated surface of the cement concrete, wherein said primer composition comprises (a)
    a both terminal (meth)acryl-modified liquid polybutadiene, a both terminal (meth)acryl modified polyacrylonitrilebutadiene or a both terminal (meth) acryl-modified liquid partially hydrogenated polybutadiene,
    (b) a monofunctional (meth)acrylate,
    (c) a polymerization initiator,
    (d) a decomposition accelerator, and
    (f) a coupling agent.

7. The composite body of cement concrete and resin concrete according to claim 6, wherein the resin concrete is radical polymerizable resin concrete.

8. A method for producing a composite body of cement concrete and resin concrete, which comprises coating resin concrete on the surface of cement concrete having a primer composition for resin concrete coated thereon, wherein said primer composition comprises
    (a) both terminal (meth)acryl-modified liquid polybutadiene, a both terminal (meth)acryl modified polyacrylonitrilebutadiene or a both terminal (meth) acryl-modified liquid partially hydrogenated polybutadiene,
    (b) a monofunctional (meth)acrylate,
    (c) a polymerization initiator,
    (d) a decomposition accelerator, and
    (f) a coupling agent.

9. The method for producing a composite body of cement concrete and resin concrete according to claim 8, wherein the resin concrete is radical polymerizable resin concrete.

10. The method according to claim 8, wherein the decomposition accelerator comprises a metal salt of an organic acid and/or an organometal chelate compound.

11. A cured body of the cement concrete obtained by the method as defined in claim 8.

12. A method for coating a primer composition for resin concrete, which comprises coating a primer composition for resin concrete on said concrete, wherein said primer composition comprises (a) a both terminal (meth)acryl-modified liquid polybutadiene, a both terminal (meth)acryl modified polyacrylonitrilebutadiene or a both terminal (meth) acryl-modified liquid partially hydrogenated polybutadiene, (b) a monofunctional (meth)acrylate, (c) a polymerization initiator, (d) a decomposition accelerator, (e) a polyfunctional (meth)acrylate not having at least two ethylenically unsaturated double bonds in one molecule, and (f) a coupling agent.

13. The method according to claim 12, wherein the coupling agent is a silane or titanate.

14. The method according to claim 12, wherein (a) is present in an amount of 1 to 90 parts by weight per 100 parts by weight of (a) and (b), (b) is present in an amount of 10 to 99 parts by weight per 100 parts by weight of (a) and (b), (c) is present in an amount of from 0.2 to 10 parts by weight per 100 parts by weight of (a) and (b), (d) is present in an amount of 0.2 to 10 parts by weight per 100 parts by weight of (a) and (b), and (f) is present in an amount of from 0.001 to 5 parts by weight per 100 parts by weight of (a) and (b).

15. A composite body of cement concrete and resin concrete, which comprises cement concrete having a primer composition for resin concrete coated thereon, and resin concrete coated on the coated surface of the cement concrete, wherein said primer composition comprises (a) a both terminal (meth)acryl-modified liquid polybutadiene, a both terminal (meth)acryl modified polyacrylonitrilebutadiene or a both terminal (meth) acryl-modified liquid partially hydrogenated polybutadiene, (b) a monofunctional (meth)acrylate, (c) a polymerization initiator, (d) a decomposition accelerator, (e) a polyfunctional (meth)acrylate not having at least two ethylenically unsaturated double bonds in one molecule, and (f) a coupling agent.

16. The composite body of cement concrete and resin concrete according to claim 15, wherein the resin concrete is radical polymerizable resin concrete.

17. A method for producing a composite body of cement concrete and resin concrete, which comprises coating resin concrete on the surface of cement concrete having a primer composition for resin concrete coated thereon, wherein said primer composition comprises (a) a both terminal (meth)acryl-modified liquid polybutadiene, a both terminal (meth)acryl modified polyacrylonitrilebutadiene or a both terminal (meth) acryl-modified liquid partially hydrogenated polybutadiene, (b) a monofunctional (meth)acrylate, (c) a polymerization initiator, (d) a decomposition accelerator, (e) a polyfunctional (meth)acrylate not having at least two ethylenically unsaturated double bonds in one molecule, and (f) a coupling agent.

18. The method for producing a composite body of cement concrete and resin concrete according to claim 17, wherein the resin concrete is radical polymerizable resin concrete.

* * * * *

UNITED STATES PATENT AND TRADEMARK OFFICE
CERTIFICATE OF CORRECTION

PATENT NO. : 5,912,086

DATED : June 15, 1999

INVENTOR(S): Toshihiro ANDO, et al.

It is certified that an error appears in the above-identified patent and that said Letters Patent is hereby corrected as shown below:

On the title page, item [75], the 2nd inventor's name should be:

--Syunji Ito--

Signed and Sealed this

Sixth Day of February, 2001

Attest:

Q. TODD DICKINSON

*Attesting Officer*          *Director of Patents and Trademarks*